US012795655B2

(12) United States Patent
Liu

(10) Patent No.: US 12,795,655 B2
(45) Date of Patent: Nov. 10, 2026

(54) METHOD FOR UPLINK CHANNEL TRANSMISSION, AND DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 369 days.

(21) Appl. No.: 18/399,249

(22) Filed: Dec. 28, 2023

(65) Prior Publication Data

US 2024/0129915 A1 Apr. 18, 2024

Related U.S. Application Data

(63) Continuation of application No. PCT/CN2021/103251, filed on Jun. 29, 2021.

(51) Int. Cl.

| | |
|---|---|
| ***H04W 72/1268*** | (2023.01) |
| ***H04L 5/00*** | (2006.01) |
| ***H04W 72/0446*** | (2023.01) |
| ***H04W 72/0453*** | (2023.01) |
| ***H04W 72/231*** | (2023.01) |

(52) U.S. Cl.

CPC ....... *H04W 72/1268* (2013.01); *H04L 5/0012* (2013.01); *H04W 72/0446* (2013.01); *H04W 72/0453* (2013.01); *H04W 72/231* (2023.01)

(58) Field of Classification Search

CPC ......... H04W 72/1268; H04W 72/0453; H04W 72/231; H04W 72/23; H04W 72/0446; H04L 5/0012; H04L 1/08; H04L 5/0023; H04L 5/0053; H04L 5/0094; H04L 5/00; H04B 1/713; H04B 7/024; H04B 7/0408; H04B 7/0695

See application file for complete search history.

(56) References Cited

FOREIGN PATENT DOCUMENTS

| | | | |
|---|---|---|---|
| CN | 111246582 | A | 6/2020 |
| CN | 111935835 | A | 11/2020 |
| CN | 112398515 | A | 2/2021 |
| WO | WO 2021054726 | A1 | 3/2021 |

OTHER PUBLICATIONS

Intel Corporation, Multi-TRP Enhancements for PDCCH, PUCCH and PUSCH (Year: 2020).*

(Continued)

*Primary Examiner* — Ayanah S George

(74) *Attorney, Agent, or Firm* — Cozen O'Connor

(57) ABSTRACT

A method for an uplink channel transmission is performed by a terminal device. The method includes: receiving transmission indication information from a network device, in which the transmission indication information is configured to indicate a first repetition scheme for transmitting a physical uplink shared channel (PUSCH), and the first repetition scheme is a combination of an inter-slot repetition scheme and an intra-slot beam hopping scheme; and transmitting cooperatively the PUSCH to a plurality of transmit-receive points (TRPs) of the network device based on the first repetition scheme.

20 Claims, 7 Drawing Sheets

(56) References Cited

OTHER PUBLICATIONS

Intel Corporation "Multi-TRP enhancements for PDCCH, PUCCH and PUSCH" 3GPP TSG RAN WG1 #103-e, R1-2008978, Oct.-Nov. 2020, 17 pages.
Chinese Patent Application No. 202180002073.2 Office Action with English translation dated Mar. 21, 2025, 16 pages.
European Patent Application No. 21947475.6 Search and Opinion dated Mar. 31, 2025, 9 pages.
PCT/CN2021/103251 International Search Report dated Mar. 28, 2022, 2 pages.
Nokia, Nokia Shanghai Bell, "Summary of AI:8.1.2.1 Enhancements for Multi-TRP URLLC for PUCCH and PUSCH" 3GPP TSG RAN WG1 #102-e R1-2007182, Aug. 2020, 38 pages.
Indian Patent Application No. 202447005233, Office Action dated Feb. 25, 2026, 8 pages.

* cited by examiner

METHOD FOR UPLINK CHANNEL TRANSMISSION, AND DEVICE

CROSS REFERENCE TO RELATED APPLICATIONS

This application is a continuation application of International Application No. PCT/CN2021/103251, filed Jun. 29, 2021, the content of which is incorporated herein by reference for all purposes.

TECHNICAL FIELD

The present disclosure relates to a field of wireless communications, more particularly, to a method a for an uplink channel transmission, and a device.

BACKGROUND

A 3rd generation partnership project (3GPP) has introduced a Multiple Transmit/Receive Points (multi-TRP)-based cooperative transmission technology in a 5th-generation (5G) mobile communication technology new radio (NR) system. In Multi-TRP, a UE receives downlink signals simultaneously from two TRPs of a serving cell, providing better PDSCH coverage, reliability and/or data rates.

SUMMARY

According to an aspect of the present disclosure, a method for an uplink channel transmission is provided, and performed by a terminal device. The method includes:

- receiving transmission indication information from a network device, in which the transmission indication information is configured to indicate a first repetition scheme for transmitting a physical uplink shared channel (PUSCH), and the first repetition scheme is a combination of an inter-slot repetition scheme and an intra-slot beam hopping scheme; and
- transmitting cooperatively the PUSCH to a plurality of transmit-receive points (TRPs) of the network device based on the first repetition scheme.

According to another aspect of the present disclosure, a method for an uplink channel transmission is provided, and performed by a network device. The method includes:

- transmitting transmission indication information to a terminal device, in which the transmission indication information is configured to indicate a first repetition scheme for transmitting a physical uplink shared channel (PUSCH) by the terminal device, and the first repetition scheme is a combination of an inter-slot repetition scheme and an intra-slot beam hopping scheme; and
- receiving the PUSCH from the terminal device based on a plurality of transmit-receive points (TRPs) of the network device.

According to an aspect of the present disclosure, a terminal device is provided. The terminal device includes:

- a processor; and
- a transceiver connected to the processor;
- in which the processor is configured to load and execute executable instructions to implement:
- receiving transmission indication information from a network device, in which the transmission indication information is configured to indicate a first repetition scheme for transmitting a physical uplink shared channel (PUSCH), and the first repetition scheme is a combination of an inter-slot repetition scheme and an intra-slot beam hopping scheme; and
- transmitting cooperatively the PUSCH to a plurality of transmit-receive points (TRPs) of the network device based on the first repetition scheme.

BRIEF DESCRIPTION OF THE DRAWINGS

In order to explain the technical solutions in embodiments of the present disclosure more clearly, the drawings described in the embodiments will be briefly introduced below. Obviously, the drawings described as below are only some embodiments of the present disclosure. Those skilled in the art may obtain other drawings from these drawings without creative work.

DETAILED DESCRIPTION

Figure 1:
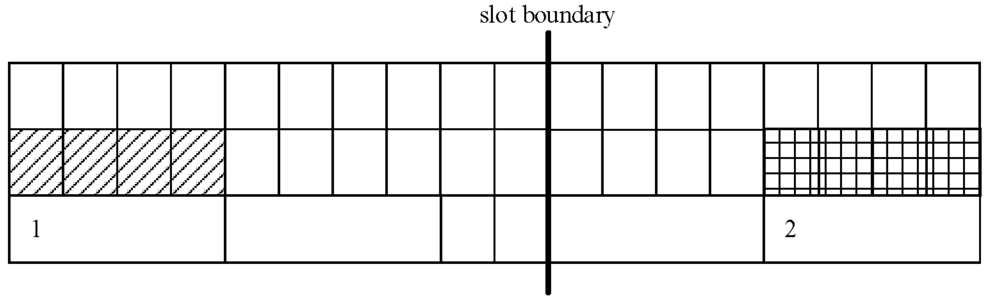
FIG. 1 is a schematic diagram illustrating a repetition according to an embodiment of the disclosure.

In order to make the purpose, technical solutions and advantages of the present disclosure more clear, the embodiments of the present disclosure will be further described below in connection with accompanying drawings.

The example embodiments will be described, and examples thereof are shown in the accompanying drawings. When the following descriptions refer to the accompanying drawings, same numbers in different drawings represent same or similar elements unless otherwise indicated. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the present disclosure are only for the purpose of describing specific embodiments and are not intended to limit the present disclosure. The singular forms "a", "the" and "said" used in the disclosure and the attached claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in this disclosure to describe various information, such information shall not be limited to these terms. These terms are only used to distinguish the same category of information. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determining".

A 3GPP introduces a multi-TRP-based collaborative transmission technology in a 5G NR system. The multi-TRPs/multi-PANELs in the network device are applied mainly to improve a coverage of an edge of a cell, provide a more balanced service quality in a service area, and cooperatively transmit data between the multi-TRPs/multi-PANELs in different ways. From the perspective of a network morphology, a network deployment is performed in a manner that combines a large number of distributed access points with baseband centralized processing, which is more conductive to providing a balanced user experience rate, and significantly reduces a latency and a signaling overhead caused by a handoff. A transmission/reception of a channel is performed from a plurality of beams in a plurality of directions by using cooperation of the multi-TRPs/PANELs, which may overcome various shielding/blocking effects better, guarantee robustness of a link connection, and is suitable for ultra-reliable low latency communication (URLLC) services to improve a transmission quality and satisfy a reliability requirement.

In an R16 (Release 16, a 16th version) research stage, a transmission enhancement is performed on a physical downlink shared channel (PDSCH) based on an application of a multi-TRP cooperative transmission technology. Since data transmission includes scheduling feedbacks of uplink and downlink channels, only a downlink data channel enhancement cannot ensure a service performance in the research of ultra-reliable and low latency communication (URLLC). Therefore, in the discussion of R17, a physical downlink control channel (PDCCH), a physical uplink control channel (PUCCH) and a PUSCH continue to be enhanced.

The multi-TRP-based uplink enhancement scheme discussed in R17 is mainly based on a PUSCH repetition scheme of R16. For a scheduled PUSCH, there are two repetition enhancement patterns in a time domain for a PUSCH, which are a repetition type A transmission pattern and a repetition type B transmission pattern introduced in R16.

1. Repetition Type A Transmission Pattern of PUSCH

A slot-level slot aggregation PUSCH transmission of R16 is applicable to certain situations with a low latency requirement and a high reliability requirement. One PUSCH is transmitted within consecutive K (K is a positive integer) slots, namely, K transmission occasions (TOs), and starts a transmission from an S-th (S is greater than or equal to 0) symbol in an initial slot, and each TO lasts for L (L is a positive integer) symbols, and S+L cannot exceed a slot boundary.

For example, as illustrated in FIG. 1, K is equal to 2, S is equal to 4, and L is equal to 4. The terminal device performs a first repetition from a 4th symbol to a 7th symbol in a first slot, and performs a second repetition from a 4th symbol to a 7th symbol in a second slot. Optionally, one slot includes 14 symbols, which are respectively a 0th symbol to a 13th symbol.

2. Repetition Type B Transmission Pattern of PUSCH

In order to reduce latency and improve reliability, R16 supports a PUSCH repetition scheme in unit of a mini-slot, and a PUSCH transmission is allowed to be cross slot, to further reduce a latency. On a time domain, one PUSCH starts a transmission on an Sth symbol in an initial slot, and is consecutively transmitted K TOs. Each of the K TOs consecutively occupies consecutive L symbols, and S+L may cross a slot boundary. When the TO appears crossing the slot boundary, a transmission may be re-split. For an entire transmission, L*K represents a time window length of a PUSCH transmission, a downlink (DL) symbol and other invalid symbols may be discarded and not be used for the PUSCH transmission.

Figure 2:
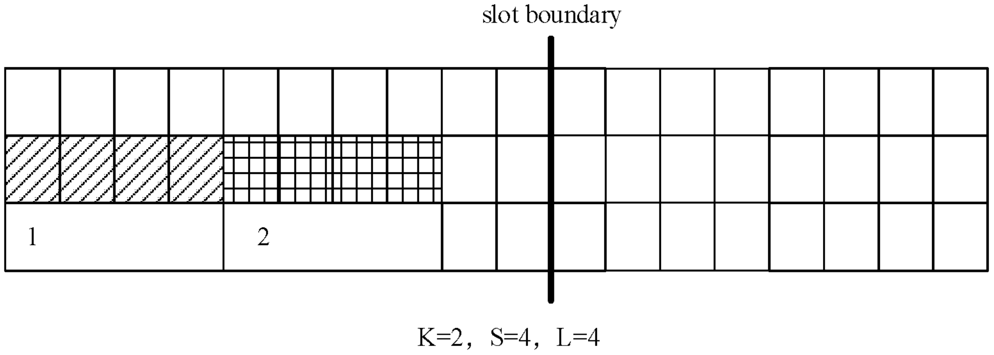
FIG. 2 is a schematic diagram illustrating a repetition according to another embodiment of the disclosure.

For example, as illustrated in FIG. 2, K is equal to 2, S is equal to 4, and L is equal to 4. The terminal device performs a first repetition from a 4th symbol to a 7th symbol of a first slot, and performs a second repetition from a 4th symbol to a 7th symbol of a second slot. Optionally, one slot includes 14 symbols, which are respectively a 0th symbol to a 13th symbol.

Figure 3:
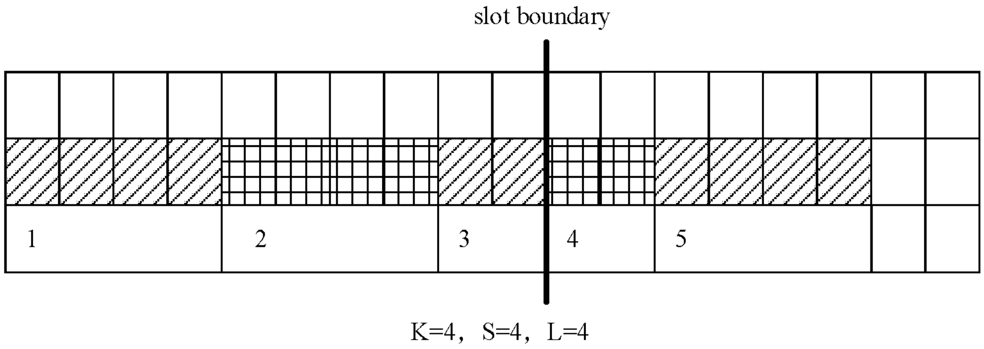
FIG. 3 is a schematic diagram illustrating a repetition according to another embodiment of the disclosure.

For example, as illustrated in FIG. 3, K is equal to 4, S is equal to 4, and L is equal to 4. The terminal device performs a first repetition from a 4th symbol to a 7th symbol of a first slot, and performs a second repetition from a 4th symbol to a 7th symbol of a second slot. Since 4 symbols of a third repetition crosses a slot boundary of the first slot, the third repetition is split into two repetitions, the third repetition is performed from a 12th symbol to a 13th symbol of the first slot, and a fourth repetition is performed from a 1st symbol to a 2nd symbol of the second slot. A fifth repetition is performed from a 3rd symbol to a 7th symbol of the second slot. That is, the terminal device actually performs 5 repetitions, and each of the 5 repetitions transmits same data. Optionally, one slot includes 14 symbols, which are respectively a 0th symbol to a 13th symbol.

Figure 4:
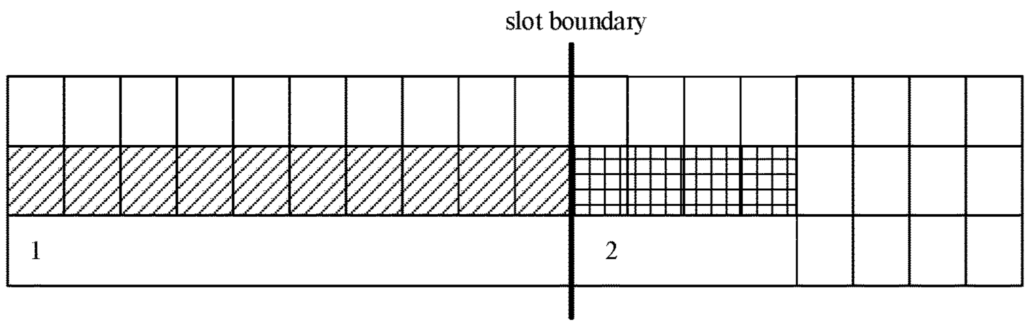
FIG. 4 is a schematic diagram illustrating a repetition according to another embodiment of the disclosure.

For example, as illustrated in FIG. 4, K is equal to 1, S is equal to 4, and L is equal to 14. Since a length of one slot is 14 symbols, a transmission starts from a 4th symbol of an initial slot, and each TO occupies 14 symbols. In this case, 14 symbols of a first repetition may cross a slot boundary, and the first repetition is split into two repetitions. The first repetition is performed from a 4th symbol to a 13th symbol of the first slot, and a second repetition is performed from a 1st symbol to a 4th symbol of the second slot. That is, the terminal device actually performs 2 repetitions, and each of the 2 repetitions transmits same data. Optionally, one slot includes 14 symbols, which are respectively a 0th symbol to a 13th symbol.

In a multi-TRP enhancement of R17, the PUSCH supports, under the transmission manner as defined above, cooperatively transmitting a same transport block (TB) to different TRPs in different TOs, to further improve transmission reliability by using spatial multiplexing transmission. The enhancement scheme discussed mainly includes a multi-TRP scheme based on a repetition type A, and a multi-TRP scheme based on a repetition type B.

There are a plurality of mapping schemes to consider for a mapping relationship between beam transmission directions of a PUCCH/PUSCH transmitted by the terminal device towards different TRPs and different TOs. The following provides three typical schemes as examples.

A scheme a: periodic mapping. Two beam directions are sequentially and cyclically mapped to a plurality of configured TOs. For example, when performing 4 transmissions, a pattern of beam direction mapping may be #1 #2 #1 #2. #1 corresponds to a first beam direction, and #2 corresponds to a second beam direction.

A scheme b: consecutive mapping. Two beam directions are consecutively and cyclically mapped to a plurality of configured TOs. For example, when performing 4 repetitions, a pattern of beam direction mapping may be #1 #1 #2 #2. For more than 4 transmissions, the pattern is repeated. For example, for 8 transmissions, a pattern of beam direction mapping may be #1 #1 #2 #2 #1 #1 #2 #2. #1 corresponds to a first beam direction, and #2 corresponds to a second beam direction.

A scheme c: half&half mapping. Two beam directions are consecutively mapped to a plurality of configured TOs. For example, when there are 8 transmissions, a pattern of beam direction mapping may be #1 #1 #1 #1 #2 #2 #2 #2. #1 corresponds to a first beam direction, and #2 corresponds to a second beam direction.

In the discussion of R17, there is a multi-TRP-based cooperative transmission technology with a certain implementation advantage, that is, an intra-slot beam hopping scheme. The intra-slot beam hopping scheme is based on an intra-slot frequency hopping scheme, and it is recommended to use different transmitting beams for different frequency hopping resources. That is, for a slot used for a PUSCH transmission, the terminal device performs the PUSCH transmission on different intra-slot frequency hopping resources towards different TRPs of a same network device.

Figure 5:
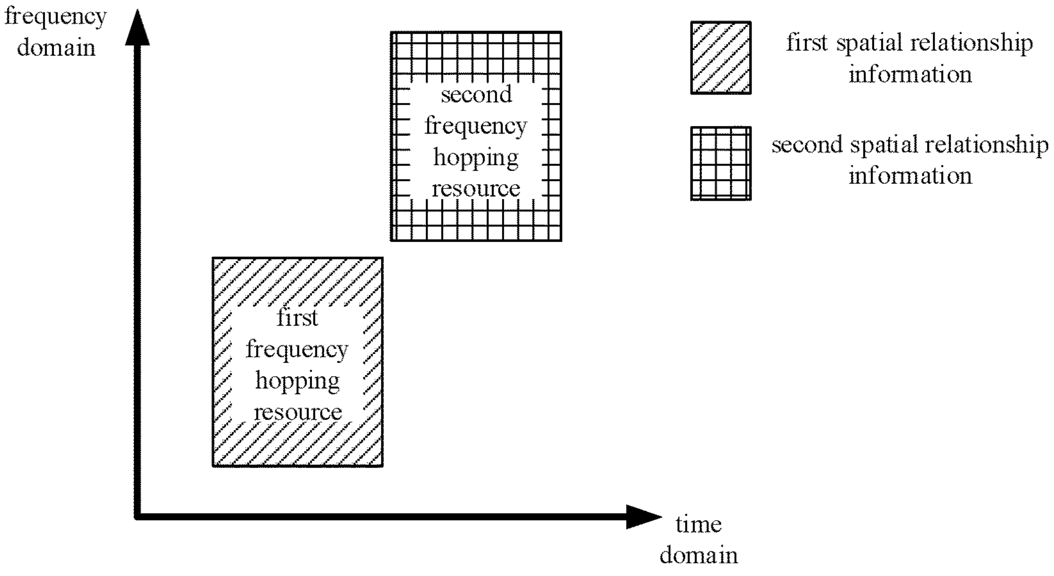
FIG. 5 is a schematic diagram illustrating an inter-slot beam hopping scheme according to an embodiment of the disclosure.

For example, as illustrated in FIG. 5, the terminal device is configured with the intra-slot frequency hopping scheme, and the terminal device performs a PUSCH transmission by using the intra-slot beam hopping scheme on the basis of the intra-slot frequency hopping scheme. That is, the PUSCH transmission of the terminal device on the first frequency hopping resource is towards a TRP1, and the PUSCH transmission of the terminal device on the second frequency hopping resource is towards a TRP2.

With adopting the intra-slot beam hopping scheme, the terminal device may obtain a beam diversity gain within a slot. Since the intra-slot beam hopping scheme is based on the intra-slot frequency hopping scheme, complexity of implementing the intra-slot beam hopping scheme by the terminal device is relatively low. However, in the above intra-slot beam hopping scheme, the terminal device transmits the PUSCH to different TRPs of the network device through cooperation of different intra-slot frequency hopping resources, without performing a repetition of the PUSCH on a plurality of intra-slot frequency hopping resources, thus, transmission reliability of the PUSCH is low, and performance deterioration in a case of blockage and deep fading is difficult to be resisted.

On the basis of this, a method for an uplink channel transmission is provided in embodiments of the disclosure, to improve transmission reliability of a PUSCH. The technical solution provided in the present disclosure is described in several embodiments below.

Figure 6:
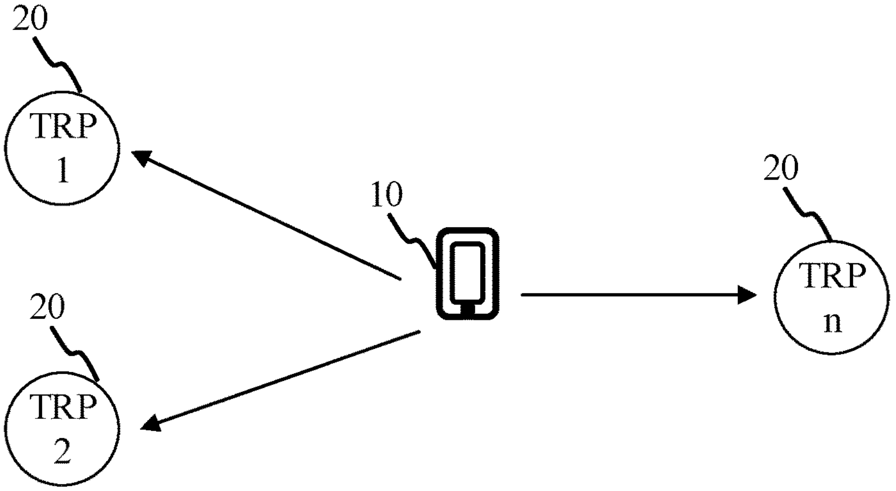
FIG. 6 is a schematic diagram illustrating a communication system according to an illustrative embodiment of the disclosure.

FIG. 6 is a schematic diagram illustrating a communication system in an embodiment of the present disclosure. The communication system may include a terminal device 10 and a network device.

A number of the terminal device 10 is generally multiple, and one or more terminal devices 10 may be distributed in a cell managed by each network device. The terminal device 10 may include all kinds of handheld devices with a wireless communication function, vehicle devices, wearable devices, computing devices or other processing devices connected to wireless modems, as well as various forms of user equipments (UE), mobile stations (MS), etc. For convenience of description, in embodiments of the disclosure, the device mentioned above is collectively referred to as a terminal device.

The network device is an apparatus deployed in an access network that provides a wireless communication function for the terminal device 10. The network device may include various forms of macro base stations, micro base stations, relay stations, access points, etc. In the system adopting different wireless access technologies, names of the devices with a network device function may vary, for example, in a 5G NR system, it is referred to as gNodeB or gNB. With evolution of communication technologies, the name of the "network device" may vary. For convenience of description, in embodiments of the present disclosure, the above apparatus that provides a wireless communication function for the terminal device 10 is collectively referred to as a network device. In an example, the network device and the terminal device 10 communicate with each other through some kind of air interface technology, for example, a Uu interface.

In an example, one network device may be deployed with a plurality of TRPs. For example, as illustrated in FIG. 6, the network device corresponds to a TRP1, a TRP2 . . . a TRPn (the TRP is numbered as 20 in FIG. 6). The terminal device may transmit an uplink channel (for example, a PUSCH) towards different TRPs by using different transmitting beams, and the network device may receive the uplink channel (for example, the PUSCH) from the terminal device via a plurality of TRPs. For example, since different TRPs have different relative orientations to the terminal device, the terminal device needs to use transmitting beams in different beam directions to transmit an uplink channel (such as a PUSCH) to a TRP in a corresponding direction.

A "5G NR system" in embodiments of the disclosure may be also referred to as a 5G system or an NR system, which may be understood by those skilled in the art. The technical solution described in embodiments of the disclosure may be applicable the a 5G NR system, and may also be applicable to a subsequent evolution system of the 5G NR system.

Figure 7:
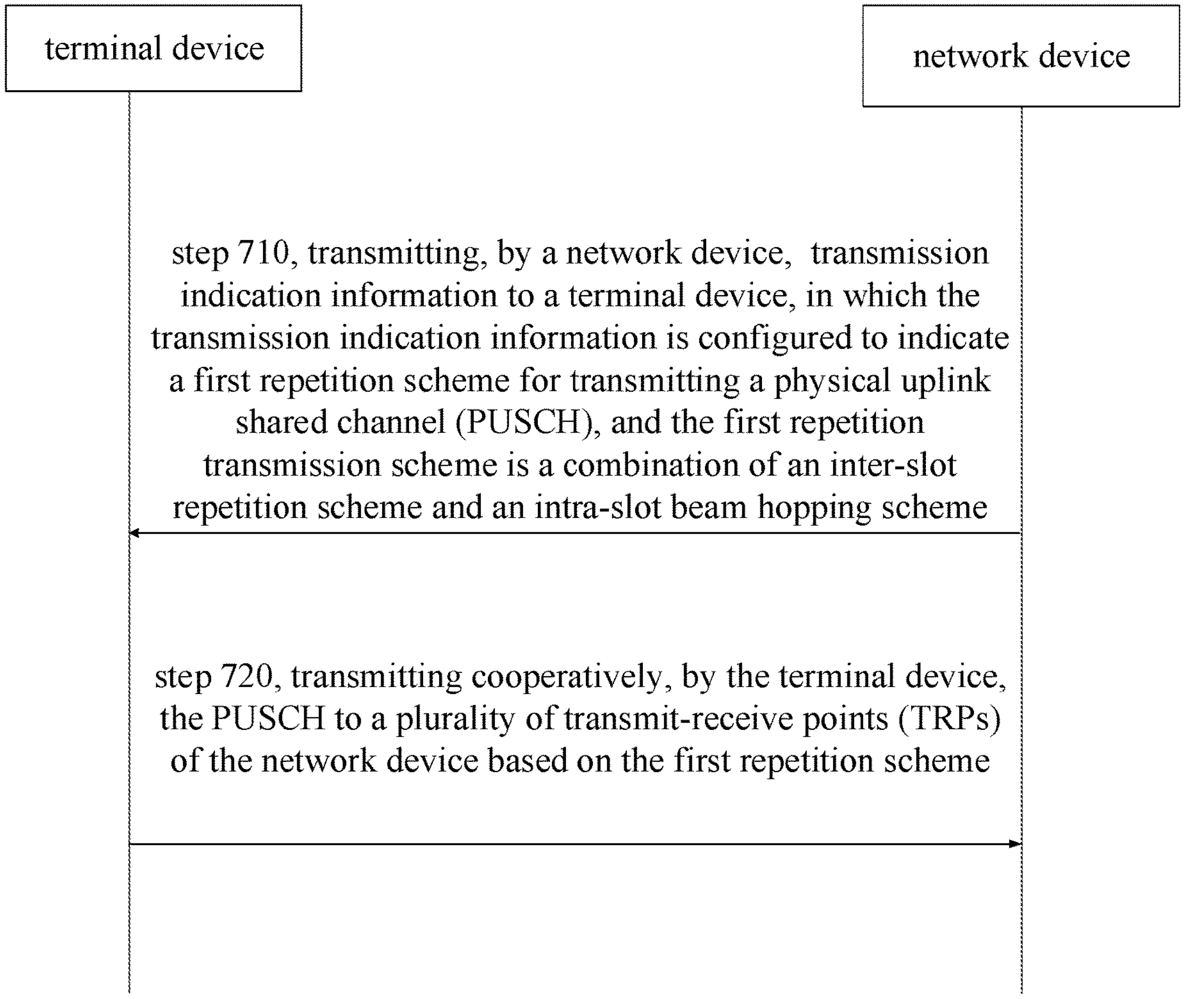
FIG. 7 is a schematic diagram illustrating a method for an uplink repetition according to an embodiment of the disclosure.

FIG. 7 is a flowchart of a method for an uplink channel estimation according to an illustrative embodiment of the disclosure. The method may be applicable to a communication system as illustrated in FIG. 6. The method may include following steps.

At step 710, a network device transmits transmission indication information to a terminal device. The transmission indication information is configured to indicate a first repetition scheme for transmitting a physical uplink shared channel (PUSCH), and the first repetition scheme is a combination of an inter-slot repetition scheme and an intra-slot beam hopping scheme.

In embodiments of the disclosure, a transmission scheme of a PUSCH is indicated by the network device for the terminal device. In order to improve transmission reliability of the PUSCH, the terminal device may repeatedly transmit the PUSCH, and in order to obtain a beam diversity gain simultaneously, the terminal device may transmit the PUSCH by means of beam hopping.

Based on this, in embodiments of the present disclosure, the network device indicates for the terminal device the first repetition scheme for transmitting the PUSCH by the terminal device based on the transmission indication information. The first repetition scheme is the combination of the inter-slot repetition scheme and the intra-slot beam hopping scheme. Optionally, the inter-slot repetition scheme is the repetition type A transmission pattern as described above. Therefore, when a repetition of a PUSCH is required, the network device is to be indicated the intra-slot beam hopping scheme for the terminal device, so that the terminal device clarifies the first repetition scheme.

The specific pattern that the network device indicates the first repetition scheme is not limited in embodiments of the disclosure. In an example, the network device may directly indicate for the terminal device that an intra-slot transmission scheme is the intra-slot beam hopping scheme, so that the transmission indication information includes: an intra-slot transmission scheme being the intra-slot beam hopping scheme. Optionally, the network device may also indicate a frequency hopping scheme for the terminal device, so that the transmission indication information further includes: the intra-slot frequency hopping scheme and/or an inter-slot frequency hopping scheme. In another example, the network device may enable the first repetition scheme based on configuration of the frequency hopping scheme, so that the transmission indication information includes: transmission of the PUSCH using the first repetition scheme in response to an intra-slot frequency hopping scheme and/or an inter-slot frequency hopping scheme being configured.

In an example, the first repetition scheme includes: performing an inter-slot repetition within n slots, and performing an intra-slot beam hopping within each of the n slots; n is an integer greater than or equal to 1. Optionally, the inter-slot repetition scheme is the above repetition type A transmission pattern of the PUSCH, so that performing by the terminal device the inter-slot repetition within the n slots including: transmitting by the terminal device a PUSCH once within each of the n slots. That is, a number of repetitions of the PUSCH is n.

In order to make the terminal device clarify the number of repetitions, the network device may configure or indicate n for the terminal device. In an example, the network device may configure the number n of repetitions for the terminal device, so that the method further includes: transmitting, by the network device, a radio resource control (RRC) signaling to the terminal, and the RRC signaling being used to configure n. In another example, the network device may indicate the number n of repetitions to the terminal device more dynamically. Optionally, the network device may explicitly indicate n to the terminal device, so that the method further includes: transmitting, by the network device, a media access control (MAC) control element (CE) to the terminal device, and the MAC CE being used to indicate n. Optionally, the network device may implicitly indicate n to the terminal device, so that the above method further includes: transmitting, by the network device, downlink control information (DCI) to the terminal device, and the DCI being used to indicate n. For example, a time domain resource allocation (TDRA) field in the DCI implicitly indicates n.

For additional descriptions of the first repetition scheme, please refer to the following embodiments, which are not repeated herein.

At step 720, the terminal device cooperatively transmits the PUSCH to a plurality of transmit-receive points (TRPs) of the network device based on the first repetition scheme.

The terminal device may cooperatively transmit the PUSCH to the plurality of TRPs of the network device based on the first repetition scheme indicated by the transmission indication information in response to receiving the transmission indication information. The terminal device transmits the PUSCH by using transmitting beams in different directions towards different transmission points of the network device. It may be understood that the transmission points in embodiments of the disclosure may be referred to as transmit-reception points (TRPs).

In summary, in the technical scheme provided in embodiments of the disclosure, when the network device indicates the first repetition scheme for transmitting the PUSCH for the terminal device, the terminal device cooperatively transmits the PUSCH to the plurality of transmission points of the network device based on the first repetition scheme, thus, a multi-TRP-based method for an uplink channel transmission is provided. Since the first repetition scheme is the combination of the inter-slot repetition scheme and the intra-slot beam hopping scheme, the terminal device may improve transmission reliability of the PUSCH in the inter-slot repetition scheme while obtaining a beam diversity gain based on the intra-slot beam hopping scheme at the same time, which may effectively resist performance deterioration in a case of blockage and deep fading, and adapt to different service requirements on latency and performance more flexibly.

The following illustrates a frequency resource occupied by a frequency hopping resource in the first repetition scheme and a beam mapping situation of the frequency hopping resource.

First, it is to be noted that, in embodiments of the disclosure, a resource size occupied by a frequency hopping resource corresponding to each of the n slots is same, and resource sizes occupied by different frequency hopping resources corresponding to a same slot of the n slots are same or different. Taking each of the n slots corresponding to a first frequency hopping resource and a second frequency hopping resource for example, the resource size occupied by the corresponding frequency hopping resource corresponding to each of the n slots being same includes: a resource size occupied by the first frequency hopping resource corresponding to each of the n slots being a first resource size; and a resource size occupied by the second frequency hopping resource corresponding to each of the n slots being a second resource size. Taking each of the n slots corresponding to a first frequency hopping resource and a second frequency hopping resource for example, the resource sizes occupied by different frequency hopping resources corresponding to the same slot of the n slots being same or different includes: resource sizes respectively occupied by the first frequency hopping resource and the second frequency hopping resource corresponding to the same slot of the n slots being same or different.

Optionally, since bandwidths occupied by different frequency hopping resources corresponding to the same slot are same, the resource size occupied by the frequency hopping resource may be generally determined based on a number of symbols occupied by the frequency hopping resource on the time domain. The resource size occupied by the frequency hopping resource corresponding to each of the n slots being same may be referred to as that a number of symbols occupied by the frequency hopping resource corresponding to each of the n slots is same. The resource sizes occupied by different frequency hopping resources corresponding to the same slot of the n slots being same or different may be referred to as that the numbers of symbols occupied by different frequency hopping resources corresponding to the same slot of the n slots are same or different. Optionally, different frequency hopping resources are not overlapped on the time domain; and different frequency hopping resources may be overlapped on a frequency domain.

In a possible implementation, a frequency resource occupied by a frequency hopping resource corresponding to each of the n slots is same, and frequency resources occupied by different frequency hopping resources corresponding to a same slot of the n slots are same or different, and a beam mapping of the frequency hopping resource corresponding to each of the n slots is same.

Taking each of the n slots corresponding to a first frequency hopping resource and a second frequency hopping resource for example, the frequency resource occupied by the frequency hopping resource corresponding to each of the n slots being same includes: a frequency hopping resource occupied by the first frequency hopping resource corresponding to each of the n slots being a first frequency resource; and a frequency hopping resource occupied by the second frequency hopping resource corresponding to each of the n slots being a second frequency resource.

Taking each of the n slots corresponding to a first frequency hopping resource and a second frequency hopping resource for example, the resource frequencies occupied by different frequency hopping resources corresponding to the same slot of the n slots being same or different includes: resource frequencies respectively occupied by the first frequency hopping resource and the second frequency hopping resource corresponding to the same slot of the n slots being same or different.

Taking each of the n slots corresponding to a first frequency hopping resource and a second frequency hopping resource for example, the beam mapping of the frequency hopping resource corresponding to each of the n slots being same includes: the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

Optionally, since bandwidths occupied by different frequency hopping resources corresponding to the same slot are same, frequency resources being same or different may be generally determined based on initial frequency positions. If the initial frequency positions of different frequency hopping resources are same, the frequency resources occupied by different frequency hopping resources are same. If the initial frequency positions of different frequency hopping resources are different, the frequency resources occupied by different frequency hopping resources are different.

Figure 8:
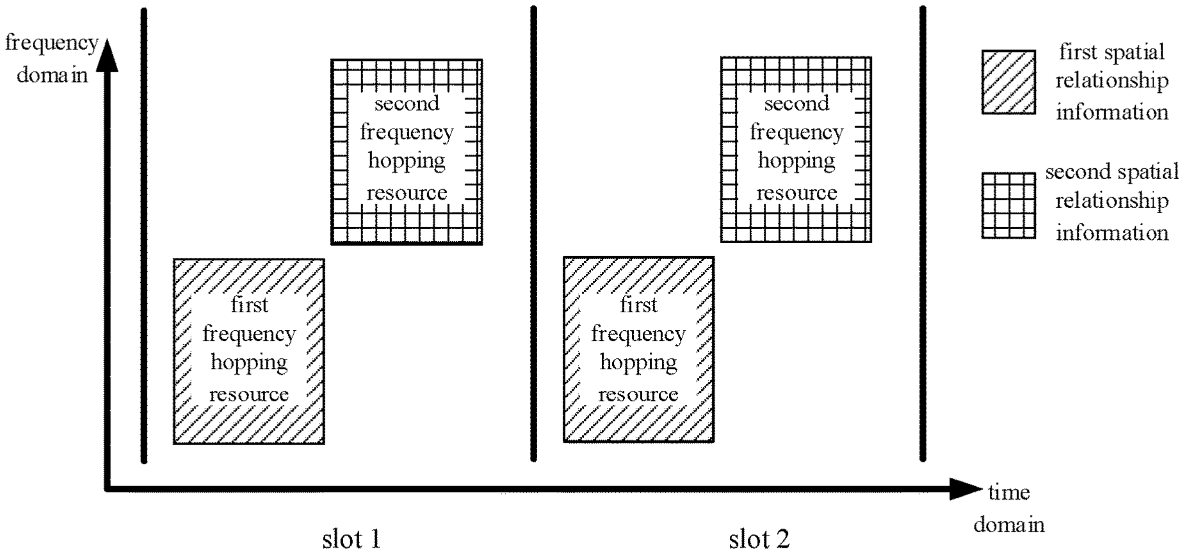
FIG. 8 is a schematic diagram illustrating a frequency and a beam mapping according to an embodiment of the disclosure.

For example, as illustrated in FIG. 8, n is 2. The terminal device performs a first repetition of the PUSCH within a slot 1, and performs a second repetition of the PUSCH within a slot 2. As illustrated in FIG. 8, each of the slot 1 and the slot 2 corresponds to a first frequency hopping resource and a second frequency hopping resource. Frequency resources occupied by the first frequency hopping resource corresponding to the slot 1 and the first frequency hopping resource corresponding to the slot 2 are same, and frequency resources occupied by the second frequency hopping resource corresponding to the slot 1 and the second frequency hopping resource corresponding to the slot 2 are same; and frequency resources occupied by the first frequency hopping resource and the second frequency hopping resource corresponding to the slot 1 are different, and frequency resources occupied by the first frequency hopping resource and the second frequency hopping resource corresponding to the slot 2 are different. As illustrated in FIG. 8, spatial relationship information of the first frequency hopping resource corresponding to the slot 1 is the same as spatial relationship information of the first frequency hopping resource corresponding to the slot 2. For example, the first frequency hopping resource corresponding to the slot 1 and the first frequency hopping resource corresponding to the slot 2 are mapped to a transmitting beam corresponding to a TRP1. Spatial relationship information of the second frequency hopping resource corresponding to the slot 1 is the same as spatial relationship information of the second frequency hopping resource corresponding to the slot 2. For example, the second frequency hopping resource corresponding to the slot 1 and the second frequency hopping resource corresponding to the slot 2 are mapped to a transmitting beam corresponding to a TRP2.

With the beam mapping of the frequency hopping resource corresponding to each of the n slots being same, and the intra-beam beam hopping being performed within each of the n slots, the terminal device is required to switch the transmitting beam between adjacent two slots. In an example, in order to reduce a number of beam switchings, the network device may configure that only a beam mapping flipping occurs within a certain slot or certain slots. That is, the method further includes: the network device transmits beam flipping mapping information to the terminal device. The beam flipping mapping information is configured to indicate that only a beam mapping flipping occurs within k of the n slots, where k is a positive integer less than or equal to n. Optionally, the network device may indicate a beam mapping flipping by multiplexing a beam mapping signaling. The beam mapping signaling is used to indicate a mapping relationship between beam transmission directions of a PUSCH and different transmission occasions.

Taking each of the n slots corresponding to a first frequency hopping resource and a second frequency hopping resource for example, only the beam mapping flipping occurring within k of the n slots includes: a first frequency hopping resource corresponding to each of (n-k) slots being mapped to a transmitting beam corresponding to a first transmit-receive point (TRP); a second frequency hopping resource corresponding to each of the (n-k) slots being mapped to a transmitting beam corresponding to a second transmit-receive point (TRP); the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

Figure 9:
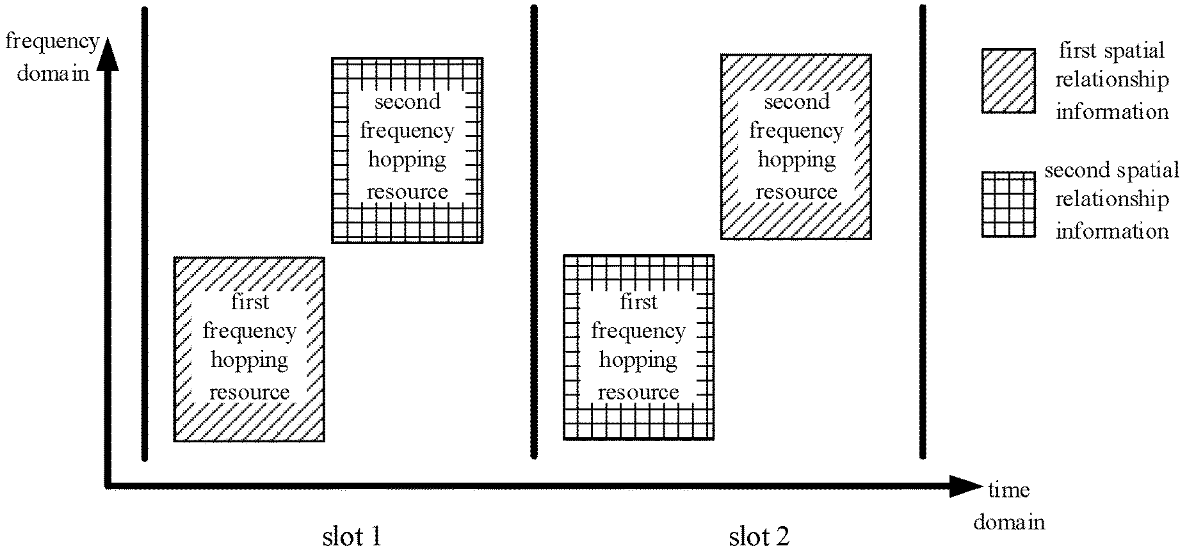
FIG. 9 is a schematic diagram illustrating a frequency and a beam mapping according to another embodiment of the disclosure.

For example, as illustrated in FIG. 9, n is 2. The terminal device performs a first repetition of a PUSCH within a slot 1, and performs a second repetition of a PUSCH within a slot 2. As illustrated in FIG. 9, spatial relationship information of the first frequency hopping resource corresponding to the slot 1 is different from spatial relationship information of the second frequency hopping resource corresponding to the slot 1. For example, the first frequency hopping resource corresponding to the slot 1 is mapped to a transmitting beam corresponding to a TRP1. The second frequency hopping resource corresponding to the slot 1 is mapped to a transmitting beam corresponding to a TRP2. In order to reduce a number of beam switchings, the network device may configure for the terminal device that the beam mapping flipping occurs within the slot 2. Therefore, as illustrated in FIG. 9, spatial relationship information of the first frequency hopping resource corresponding to the slot 2 is the same as spatial relationship information of the second frequency hopping resource corresponding to the slot 1. For example, the first frequency hopping resource corresponding to the slot 2 and the second frequency hopping resource corresponding to the slot 1 are mapped to the transmitting beam corresponding to the TRP2. Spatial relationship information of the second frequency hopping resource corresponding to the slot 2 is the same as spatial relationship information of the first frequency hopping resource corresponding to the slot 1. For example, the second frequency hopping resource corresponding to the slot 2 and the first frequency hopping resource corresponding to the slot 1 are mapped to the transmitting beam corresponding to the TRP1.

In an example, in order to further obtain a frequency diversity gain on the same beam, the network device may configure that only a frequency mapping flipping occurs within a certain slot or certain slots. That is, the method further includes: the network device transmitting frequency flipping mapping information to the terminal device. The frequency flipping mapping information is configured to indicate that only a frequency mapping flipping occurs within i of the n slots, in which i is a positive integer less than or equal to n. Optionally, the network device may indicate a frequency mapping flipping by multiplexing a beam mapping signaling. The beam mapping signaling is used to indicate a mapping relationship between beam transmission directions of the PUSCH and different transmission occasions.

Taking each of the n slots corresponding to a first frequency hopping resource and a second frequency hopping resource for example, only the frequency mapping flipping occurring within i of the n slots includes: a frequency resource occupied by the first frequency hopping resource corresponding to each of (n−i) slots being a first frequency resource; a frequency resource occupied by the second frequency hopping resource corresponding to each of the (n−i) slots being a second frequency resource; the frequency resource occupied by the first frequency hopping resource corresponding to each of the i slots being the second frequency resource; and the frequency resource occupied by the second frequency hopping resource corresponding to each of the i slots being the first frequency resource.

Figure 10:
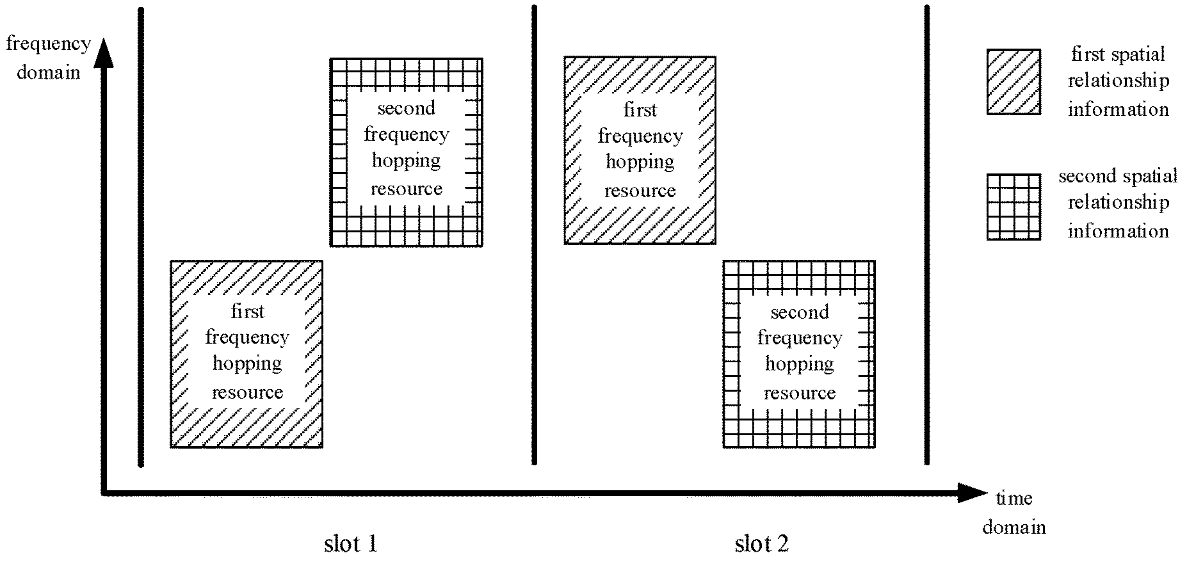
FIG. 10 is a schematic diagram illustrating a frequency and a beam mapping according to another embodiment of the disclosure.

For example, as illustrated in FIG. 10, n is 2. The terminal device performs a first repetition of the PUSCH within a slot 1, and performs a second repetition of the PUSCH within a slot 2. As illustrated in FIG. 10, spatial relationship information of the first frequency hopping resource corresponding to the slot 1 is the same as spatial relationship information of the first frequency hopping resource corresponding to the slot 2. For example, the first frequency hopping resource corresponding to the slot 1 and the first frequency hopping resource corresponding to the slot 2 are mapped to a transmitting beam corresponding to a TRP1. Spatial relationship information of the second frequency hopping resource corresponding to the slot 1 is the same as spatial relationship information of the second frequency hopping resource corresponding to the slot 2. For example, the second frequency hopping resource corresponding to the slot 1 and the second frequency hopping resource corresponding to the slot 2 are mapped to a transmitting beam corresponding to a TRP2. As illustrated in FIG. 10, frequency resources occupied by the first frequency hopping resource and the second frequency hopping resource corresponding to the slot 1 are different. For example, a frequency hopping resource occupied by the first frequency hopping resource corresponding to the slot 1 is a first frequency resource; and a frequency hopping resource occupied by the second frequency hopping resource corresponding to the slot 1 is a second frequency resource. In order to further obtain a frequency diversity gain on the same beam, the network device configures for the terminal device that the frequency mapping flipping occurs within the slot 2. As illustrated in FIG. 10, frequency resources occupied by the first frequency hopping resource corresponding to the slot 2 and the second frequency hopping resource corresponding to the slot 1 are same. For example, the frequency resources occupied by the first frequency hopping resource corresponding to the slot 2 and the second frequency hopping resource corresponding to the slot 1 are the second frequency resource. The frequency resources occupied by the second frequency hopping resource corresponding to the slot 2 and the first frequency hopping resource corresponding to the slot 1 are same. For example, the frequency resources occupied by the second frequency hopping resource corresponding to the slot 2 and the first frequency hopping resource corresponding to the slot 1 are the first frequency resource.

In another possible implementation, frequency resources occupied by frequency hopping resources corresponding to adjacent slots of the n slots are different, frequency resources occupied by different frequency hopping resources corresponding to a same slot of the n slots are same or different, and a beam mapping of a frequency hopping resource corresponding to each of the n slots is same.

Taking each of the n slots corresponding to a first frequency hopping resource and a second frequency hopping resource for example, the frequency resources occupied by frequency hopping resources corresponding to adjacent slots of the n slots being different includes: frequency resources occupied by the first frequency hopping resource corresponding to adjacent slots of the n slots being different; and frequency resources occupied by the second frequency hopping resource corresponding to adjacent slots of the n slots being different.

Taking each of the n slots corresponding to a first frequency hopping resource and a second frequency hopping resource for example, the resource frequencies occupied by different frequency hopping resources corresponding to the same slot of the n slots being same or different includes: resource frequencies occupied by the first frequency hopping resource and the second frequency hopping resource corresponding to the same slot of the n slots being same or different.

Taking each of the n slots corresponding to a first frequency hopping resource and a second frequency hopping resource for example, the beam mapping of the corresponding frequency hopping resource corresponding to each of the n slots being same includes: the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

Optionally, since bandwidths occupied by different frequency hopping resources corresponding to the same slot are same, the frequency resources being same or different may be generally determined by initial frequency positions. If the initial frequency positions of different frequency hopping resources are same, frequency resources occupied by different frequency hopping resources are same. If the initial frequency positions different frequency hopping resources are different, frequency resources occupied by different frequency hopping resources are different.

Figure 11:
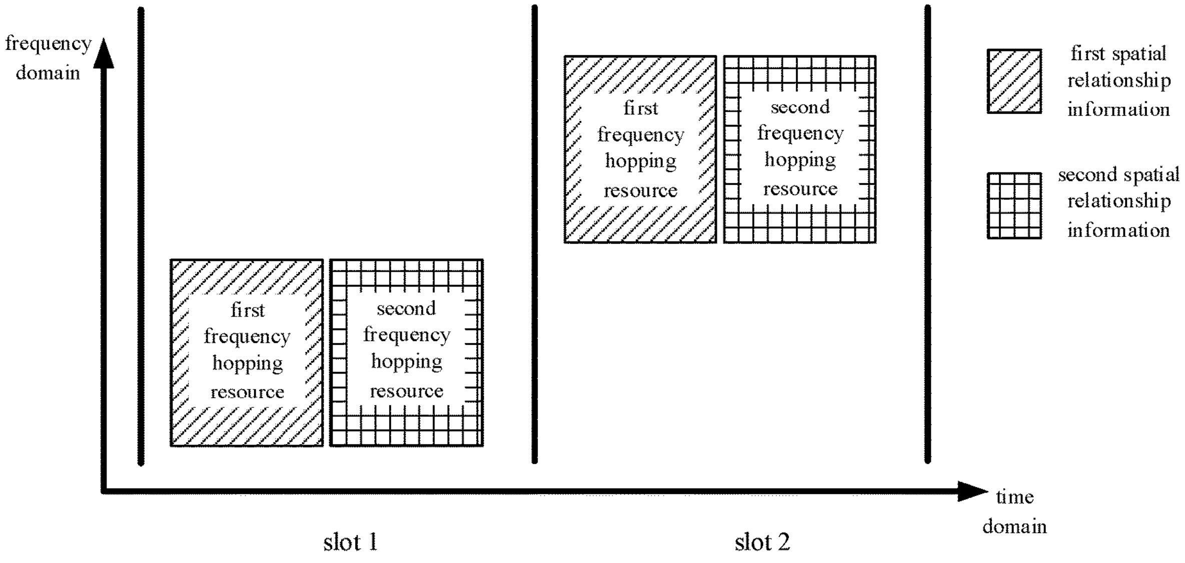
FIG. 11 is a schematic diagram illustrating a frequency and a beam mapping according to an embodiment of the disclosure.

For example, as illustrated in FIG. 11, n is 2. The terminal device performs a first repetition of the PUSCH within a slot 1, and performs a second repetition of the PUSCH within a slot 2. As illustrated in FIG. 11, each of the slot 1 and the slot 2 corresponds to a first frequency hopping resource and a second frequency hopping resource. Frequency resources occupied by the first frequency hopping resource and the second frequency hopping resource corresponding to the slot 1 are same, and frequency resources occupied by the first frequency hopping resource and the second frequency hopping resource corresponding to the slot 2 are same; and frequency resources occupied by the first frequency hopping resource corresponding to the slot 1 and the first frequency hopping resource corresponding to the slot 2 are different, and frequency resources occupied by the second frequency hopping resource corresponding to the slot 1 and the second frequency hopping resource corresponding to the slot 2 are different. As illustrated in FIG. 11, spatial relationship information of the first frequency hopping resource corresponding to the slot 1 is the same as spatial relationship information of the first frequency hopping resource corresponding to the slot 2. For example, the first frequency hopping resource corresponding to the slot 1 and the first frequency hopping resource corresponding to the slot 2 are mapped to a transmitting beam corresponding to a TRP1. Spatial relationship information of the second frequency hopping resource corresponding to the slot 1 is the same as spatial relationship information of the second frequency hopping resource corresponding to the slot 2. For example, the second frequency hopping resource corresponding to the slot 1 and the second frequency hopping resource corresponding to the slot 2 are mapped to a transmitting beam corresponding to a TRP2.

In an example, in order to reduce a number of beam switchings, the network device may configure that only a beam mapping flipping occurs within a certain slot or certain slots. The method further includes: the network device transmitting beam flipping mapping information to the terminal device. The beam flipping mapping information is configured to indicate that only a beam mapping flipping occurs within k of the n slots, in which k is a positive integer less than or equal to n. Optionally, the network device may indicate a beam mapping flipping by multiplexing a beam mapping signaling. The beam mapping signaling is used to indicate a mapping relationship between beam transmission directions of the PUSCH and different transmission occasions.

Taking each of the n slots corresponding to a first frequency hopping resource and a second frequency hopping resource for example, only the beam mapping flipping occurring within k of the n slots includes: a first frequency hopping resource corresponding to each of (n-k) slots being mapped to a transmitting beam corresponding to a first transmit-receive point (TRP); a second frequency hopping resource corresponding to each of the (n-k) slots being mapped to a transmitting beam corresponding to a second transmit-receive point (TRP); the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

Figure 12:
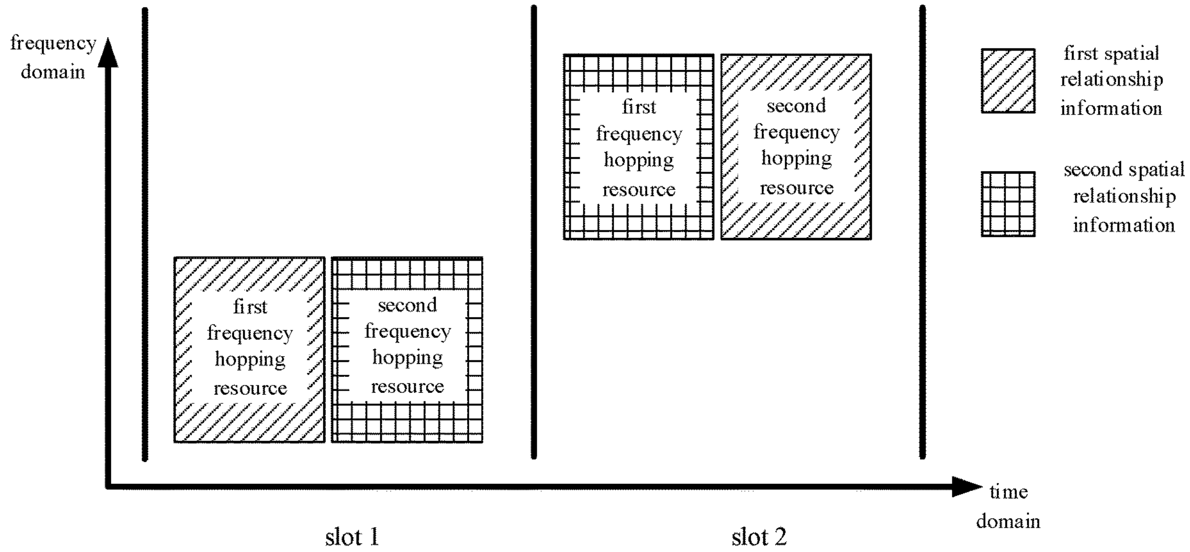
FIG. 12 is a schematic diagram illustrating a frequency and a beam mapping according to an embodiment of the disclosure.

For example, as illustrated in FIG. 12, n is 2. The terminal device performs a first repetition of a PUSCH within a slot 1, and performs a second repetition of a PUSCH within a slot 2. As illustrated in FIG. 12, spatial relationship information of the first frequency hopping resource corresponding to the slot 1 is different from spatial relationship information of the second frequency hopping resource corresponding to the slot 1. For example, the first frequency hopping resource corresponding to the slot 1 is mapped to a transmitting beam corresponding to a TRP1. The second frequency hopping resource corresponding to the slot 1 is mapped to a transmitting beam corresponding to a TRP2. In order to reduce a number of beam switchings, the network device may configure that a beam mapping flipping occurs within a slot 2 for the terminal device. Therefore, as illustrated in FIG. 12, spatial relationship information of the first frequency hopping resource corresponding to the slot 2 is the same as spatial relationship information of the second frequency hopping resource corresponding to the slot 1. For example, the first frequency hopping resource corresponding to the slot 2 and the second frequency hopping resource corresponding to the slot 1 are mapped to the transmitting beam corresponding to the TRP2. Spatial relationship information of the second frequency hopping resource corresponding to the slot 2 is the same as spatial relationship information of the first frequency hopping resource corresponding to the slot 1. For example, the second frequency hopping resource corresponding to the slot 2 and the first frequency hopping resource corresponding to the slot 1 are mapped to the transmitting beam corresponding to the TRP1.

In summary, in the technical scheme provided in embodiments of the disclosure, the intra-slot beam hopping scheme is achieved on the basis of the frequency hopping scheme, which reduces complexity of implementing the intra-slot beam hopping scheme by the terminal device, and achieves a combination of intra-slot beam hopping and inter-slot/intra-slot frequency hopping. And, in embodiments of the disclosure, the network device may configure the frequency mapping flipping for the terminal device, thus the frequency diversity gain may be obtained on the same beam. The network device may further configure the beam mapping flipping for the terminal device, thus the number of beam switchings may be reduced.

It should be noted that, in the above embodiments, the method for the uplink channel transmission provided in embodiments of the disclosure is introduced from the perspective of an interaction between the terminal device and the network device. In the above embodiment, steps executed by the terminal device, may be independently implemented as a method for an uplink channel transmission on a terminal device side, and steps executed by the network device may be independently implemented as a method for an uplink channel transmission on a network device side.

According to an aspect of the present disclosure, a method for an uplink channel transmission is provided, and performed by a terminal device. The method includes:

receiving transmission indication information from a network device, in which the transmission indication information is configured to indicate a first repetition scheme for transmitting a physical uplink shared channel (PUSCH), and the first repetition scheme is a combination of an inter-slot repetition scheme and an intra-slot beam hopping scheme; and transmitting cooperatively the PUSCH to a plurality of transmit-receive points (TRPs) of the network device based on the first repetition scheme.

In an embodiment, the transmission indication information includes: an intra-slot transmission scheme being the intra-slot beam hopping scheme;

or, the transmission indication information includes: transmission of the PUSCH using the first repetition scheme in response to an intra-slot frequency hopping scheme and/or an inter-slot frequency hopping scheme being configured.

In an embodiment, the first repetition scheme includes: performing an inter-slot repetition within n slots, and performing an intra-slot beam hopping within each of the n slots; in which, n is an integer greater than or equal to 1.

In an embodiment, the method further includes:

receiving a radio resource control (RRC) signaling from the network device, in which, the RRC signaling is configured to configure n;

or, receiving a media access control (MAC) control element (CE) or downlink control information (DCI) from the network device, in which, the MAC CE or the DCI is configured to indicate n.

In an embodiment, a resource size occupied by a frequency hopping resource corresponding to each of the n slots is same, and resource sizes occupied by different frequency hopping resources corresponding to a same slot of the n slots are same or different.

In an embodiment, a frequency resource occupied by a frequency hopping resource corresponding to each of the n slots is same, and frequency resources occupied by different frequency hopping resources corresponding to a same slot of the n slots are same or different, and a beam mapping of the frequency hopping resource corresponding to each of the n slots is same.

In an embodiment, each of the n slots corresponds to a first frequency hopping resource and a second frequency hopping resource; and the beam mapping of the corresponding frequency hopping resource corresponding to each of the n slots being same includes:

the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

In an embodiment, the method further includes:

receiving beam flipping mapping information from the network device, in which, the beam flipping mapping information is configured to indicate that only a beam mapping flipping occurs within k of the n slots, in which, k is a positive integer less than or equal to n.

In an embodiment, each of the n slots corresponds to a first frequency hopping resource and a second frequency hopping resource; and only the beam mapping flipping occurring within k of the n slots includes:

a first frequency hopping resource corresponding to each of (n-k) slots being mapped to a transmitting beam corresponding to a first transmit-receive point (TRP);

a second frequency hopping resource corresponding to each of the (n-k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

In an embodiment, the method further includes:

receiving frequency flipping mapping information from the network device, in which, the frequency flipping mapping information is configured to indicate that only a beam mapping flipping occurs within i of the n slots, in which, i is a positive integer less than or equal to n.

In an embodiment, each of the n slots corresponds to a first frequency hopping resource and a second frequency hopping resource; and only the frequency mapping flipping occurring within i of the n slots includes:

a frequency resource occupied by the first frequency hopping resource corresponding to each of (n−i) slots being a first frequency resource;

a frequency resource occupied by the second frequency hopping resource corresponding to each of the (n−i) slots being a second frequency resource;

the frequency resource occupied by the first frequency hopping resource corresponding to each of the i slots being the second frequency resource; and the frequency resource occupied by the second frequency hopping resource corresponding to each of the i slots being the first frequency resource.

In an embodiment, frequency resources occupied by frequency hopping resources corresponding to adjacent slots of the n slots are different, frequency resources occupied by different frequency hopping resources corresponding to a same slot of the n slots are same or different, and a beam mapping of a frequency hopping resource corresponding to each of the n slots is same.

In an embodiment, each of the n slots corresponds to a first frequency hopping resource and a second frequency hopping resource; and the beam mapping of the frequency hopping resource corresponding to each of the n slots being same includes:

a first frequency hopping resource corresponding to each of the n slots being mapped to a transmitting beam corresponding to a first transmit-receive point (TRP); and a second frequency hopping resource corresponding to each of the n slots being mapped to a transmitting beam corresponding to a second transmit-receive point (TRP).

In an embodiment, the method further includes:

receiving beam flipping mapping information from the network device, in which, the beam flipping mapping information is configured to indicate that only a beam mapping flipping occurs within k of the n slots, in which, k is a positive integer less than or equal to n.

In an embodiment, each of the n slots corresponds to a first frequency hopping resource and a second frequency hopping resource; and only the beam mapping flipping occurring within k of the n slots includes:

a first frequency hopping resource corresponding to each of (n-k) slots being mapped to a transmitting beam corresponding to a first transmit-receive point (TRP);

a second frequency hopping resource corresponding to each of the (n-k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

According to another aspect of the present disclosure, a method for an uplink channel transmission is provided, and performed by a network device. The method includes:

transmitting transmission indication information to a terminal device, in which the transmission indication information is configured to indicate a first repetition scheme for transmitting a physical uplink shared channel (PUSCH) by the terminal device, and the first repetition scheme is a combination of an inter-slot repetition scheme and an intra-slot beam hopping scheme; and receiving the PUSCH from the terminal device based on a plurality of transmit-receive points (TRPs) of the network device.

In an embodiment, the transmission indication information includes: an intra-slot transmission scheme being the intra-slot beam hopping scheme;

or, the transmission indication information includes: transmission of the PUSCH using the first repetition scheme in response to an intra-slot frequency hopping scheme and/or an inter-slot frequency hopping scheme being configured.

In an embodiment, the first repetition scheme includes: performing an inter-slot repetition within n slots, and performing an intra-slot beam hopping within each of the n slots; in which, n is an integer greater than or equal to 1.

In an embodiment, the method further includes:

transmitting a radio resource control (RRC) signaling to the terminal device, in which, the RRC signaling is configured to configure n;

or, transmitting a media access control (MAC) control element (CE) or downlink control information (DCI) to the terminal device, in which, the MAC CE or the DCI is configured to indicate n.

In an embodiment, a resource size occupied by a frequency hopping resource corresponding to each of the n slots is same, and resource sizes occupied by different frequency hopping resources corresponding to a same slot of the n slots are same or different.

In an embodiment, a frequency resource occupied by a frequency hopping resource corresponding to each of the n slots is same, and frequency resources occupied by different frequency hopping resources corresponding to a same slot of the n slots are same or different, and a beam mapping of the frequency hopping resource corresponding to each of the n slots is same.

In an embodiment, each of the n slots corresponds to a first frequency hopping resource and a second frequency hopping resource; and the beam mapping of the frequency hopping resource corresponding to each of the n slots being same includes:

the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

In an embodiment, the method further includes:

transmitting beam flipping mapping information to the terminal device, in which, the beam flipping mapping information is configured to indicate that only a beam mapping flipping occurs within k of the n slots, in which, k is a positive integer less than or equal to n.

In an embodiment, each of the n slots corresponds to a first frequency hopping resource and a second frequency hopping resource; and only the beam mapping flipping occurring within k of the n slots includes:

a first frequency hopping resource corresponding to each of (n-k) slots being mapped to a transmitting beam corresponding to a first transmit-receive point (TRP);

a second frequency hopping resource corresponding to each of the (n-k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

In an embodiment, the method further includes:

transmitting frequency flipping mapping information to the terminal device, in which, the frequency flipping mapping information is configured to indicate that only a beam mapping flipping occurs within i of the n slots, in which, i is a positive integer less than or equal to n.

In an embodiment, each of the n slots corresponds to a first frequency hopping resource and a second frequency hopping resource; and only the frequency mapping flipping occurring within i of the n slots includes:

a frequency resource occupied by the first frequency hopping resource corresponding to each of (n−i) slots being a first frequency resource;

a frequency resource occupied by the second frequency hopping resource corresponding to each of the (n−i) slots being a second frequency resource;

the frequency resource occupied by the first frequency hopping resource corresponding to each of the i slots being the second frequency resource; and the frequency resource occupied by the second frequency hopping resource corresponding to each of the i slots being the first frequency resource.

In an embodiment, frequency resources occupied by frequency hopping resources corresponding to adjacent slots of the n slots are different, frequency resources occupied by different frequency hopping resources corresponding to a same slot of the n slots are same or different, and a beam mapping of a frequency hopping resource corresponding to each of the n slots is same.

In an embodiment, each of the n slots corresponds to a first frequency hopping resource and a second frequency hopping resource; and the beam mapping of the frequency hopping resource corresponding to each of the n slots being same includes:

a first frequency hopping resource corresponding to each of the n slots being mapped to a transmitting beam corresponding to a first transmit-receive point (TRP); and a second frequency hopping resource corresponding to each of the n slots being mapped to a transmitting beam corresponding to a second transmit-receive point (TRP).

In an embodiment, the method further includes:

transmitting beam flipping mapping information to the terminal device, in which, the beam flipping mapping information is configured to indicate that only a beam mapping flipping occurs within k of the n slots, in which, k is a positive integer less than or equal to n.

In an embodiment, each of the n slots corresponds to a first frequency hopping resource and a second frequency hopping resource; and only the beam mapping flipping occurring within k of the n slots includes:

a first frequency hopping resource corresponding to each of (n-k) slots being mapped to a transmitting beam corresponding to a first transmit-receive point (TRP);

a second frequency hopping resource corresponding to each of the (n-k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

Figure 13:
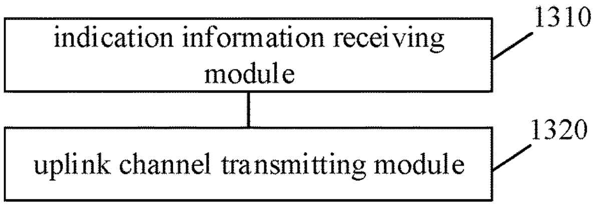
FIG. 13 is a block diagram illustrating a structure of an apparatus for an uplink channel transmission according to an embodiment of the disclosure.

FIG. 13 is a block diagram of a structure of an apparatus for an uplink channel transmission according to an illustrative embodiment of the disclosure. As illustrated in FIG. 13, the apparatus is applicable for a terminal device. The apparatus 1300 includes an indication information receiving module 1310 and an uplink channel transmitting module 1320.

The indication information receiving module 1310 is configured to receive transmission indication information from a network device. The transmission indication information is configured to indicate a first repetition scheme for transmitting a physical uplink shared channel (PUSCH). The first repetition scheme is a combination of an inter-slot repetition scheme and an intra-slot beam hopping scheme.

The uplink channel transmitting module 1320 is configured to cooperatively transmit the PUSCH to a plurality of transmit-receive points (TRPs) of the network device based on the first repetition scheme.

In an example, the transmission indication information includes: an intra-slot transmission scheme being the intra-slot beam hopping scheme; or, the transmission indication information includes: transmission of the PUSCH using the first repetition scheme in response to an intra-slot frequency hopping scheme and/or an inter-slot frequency hopping scheme being further configured.

In an example, the first repetition scheme includes: performing an inter-slot repetition within n slots, and performing an intra-slot beam hopping within each of the n slots; n is an integer greater than or equal to 1.

Figure 14:
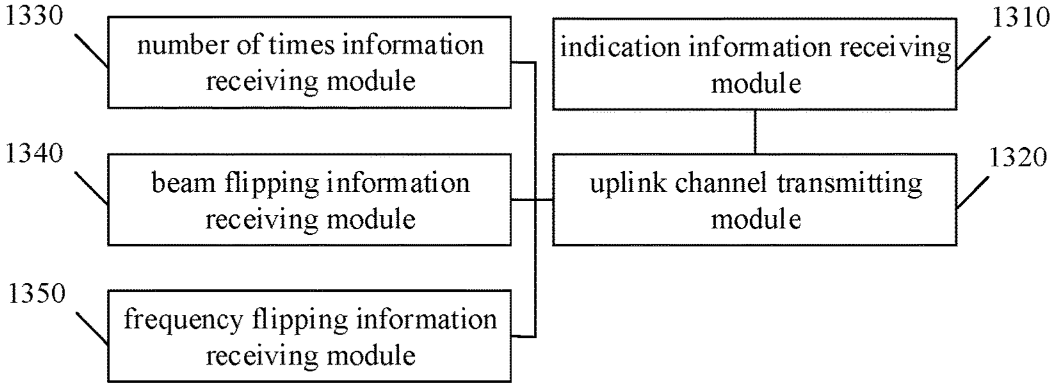
FIG. 14 is a block diagram of a structure of an apparatus for an uplink channel transmission according to another illustrative embodiment of the disclosure.

In an example, as illustrated in FIG. 14, the apparatus 1300 further includes: a number of times information receiving module 1330. The number of times information receiving module 1330 is configured to: receive a radio resource control (RRC) signaling from the network device, in which the RRC signaling is configured to configure n; or, receive a media access control (MAC) control element (CE) or downlink control information (DCI) from the network device. The MAC CE or the DCI is configured to indicate n.

In an example, a resource size occupied by a frequency hopping resource corresponding to each of the n slots is same, and resource sizes occupied by different frequency hopping resources corresponding to a same slot of the n slots are same or different.

In an example, a frequency resource occupied by a frequency hopping resource corresponding to each of the n slots is same, and frequency resources occupied by different frequency hopping resources corresponding to a same slot of the n slots are same or different, and a beam mapping of the frequency hopping resource corresponding to each of the n slots is same.

In an example, each of the n slots corresponds to a first frequency hopping resource and a second frequency hopping resource. The beam mapping of the frequency hopping resource corresponding to each of the n slots being same includes: the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

In an example, as illustrated in FIG. 14, the apparatus further includes a beam flipping information receiving module 1340. The beam flipping information receiving module 1340 is configured to receive beam flipping mapping information from the network device. The beam flipping mapping information is configured to indicate that only a beam mapping flipping occurs within k of the n slots, where k is a positive integer less than or equal to n.

In an example, each of the n slots corresponds to a first frequency hopping resource and a second frequency hopping resource; only the beam mapping flipping occurring within k of the n slots includes: a first frequency hopping resource corresponding to each of (n-k) slots being mapped to a transmitting beam corresponding to a first transmit-receive point (TRP); a second frequency hopping resource corresponding to each of the (n-k) slots being mapped to a transmitting beam corresponding to a second transmit-receive point (TRP); the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

In an example, as illustrated in FIG. 14, the apparatus further includes a frequency flipping information receiving module 1350. The frequency flipping information receiving module 1350 is configured to receive frequency flipping mapping information from the network device. The frequency flipping mapping information is configured to indicate that only a beam mapping flipping occurs within i of the n slots i is a positive integer less than or equal to n.

In an example, each of the n slots corresponds to a first frequency hopping resource and a second frequency hopping resources. Only the frequency mapping flipping occurring within i of the n slots includes: a frequency resource occupied by the first frequency hopping resource corresponding to each of (n−i) slots being a first frequency resource; a frequency resource occupied by the second frequency hopping resource corresponding to each of the (n−i) slots being a second frequency resource; the frequency resource occupied by the first frequency hopping resource corresponding to each of the i slots being the second frequency resource; and the frequency resource occupied by the second frequency hopping resource corresponding to each of the i slots being the first frequency resource.

In an example, frequency resources occupied by frequency hopping resources corresponding to adjacent slots of the n slots are different, and frequency resources occupied by different frequency hopping resources corresponding to a same slot of the n slots are same or different, and a beam mapping of the frequency hopping resource corresponding to each of the n slots is same.

In an example, each of the n slots corresponds to a first frequency hopping resource and a second frequency hopping resource. The beam mapping of the frequency hopping resource corresponding to each of the n slots being same includes: the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

In an example, as illustrated in FIG. 14, the apparatus further includes a beam flipping information receiving module 1340. The beam flipping information receiving module 1340 is configured to receive beam flipping mapping information from the network device. The beam flipping mapping information is configured to indicate that only a beam mapping flipping occurs within k of the n slots, where k is a positive integer less than or equal to the n.

In an example, each of the n slots corresponds to a first frequency hopping resource and a second frequency hopping resource; only the beam mapping flipping occurring within k of the n slots includes: a first frequency hopping resource corresponding to each of (n-k) slots being mapped to a transmitting beam corresponding to a first transmit-receive point (TRP); a second frequency hopping resource corresponding to each of the (n-k) slots being mapped to a transmitting beam corresponding to a second transmit-receive point (TRP); the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

Figure 15:
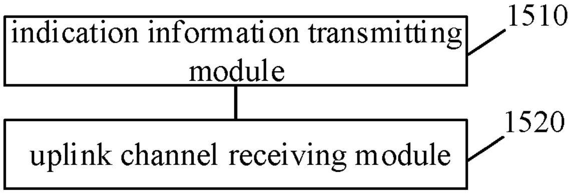
FIG. 15 is a block diagram illustrating an apparatus for an uplink channel transmission according to another embodiment of the disclosure.

FIG. 15 is a block diagram of a structure of an apparatus for an uplink channel transmission according to an illustrative embodiment of the disclosure. As illustrated in FIG. 15, the apparatus is used for a network device. The apparatus 1500 includes an indication information transmitting module 1510 and an uplink channel receiving module 1520.

The indication information transmitting module 1510 is configured to transmit transmission indication information to a terminal device. The transmission indication information is configured to indicate a first repetition scheme for transmitting a physical uplink shared channel (PUSCH) by the terminal device. The first repetition scheme is a combination of an inter-slot repetition scheme and an intra-slot beam hopping scheme.

The uplink channel receiving module 1520 is configured to receive the PUSCH from the terminal device based on a plurality of transmit-receive points (TRPs) of the network device.

In an example, the transmission indication information includes: an intra-slot transmission scheme being the intra-slot beam hopping scheme; or, the transmission indication information includes: transmission of the PUSCH using the first repetition scheme in response to an intra-slot frequency hopping scheme and/or an inter-slot frequency hopping scheme being configured.

In an example, the first repetition scheme includes: performing an inter-slot repetition within n slots, and performing an intra-slot beam hopping within each of the n slots; n is an integer greater than or equal to 1.

Figure 16:
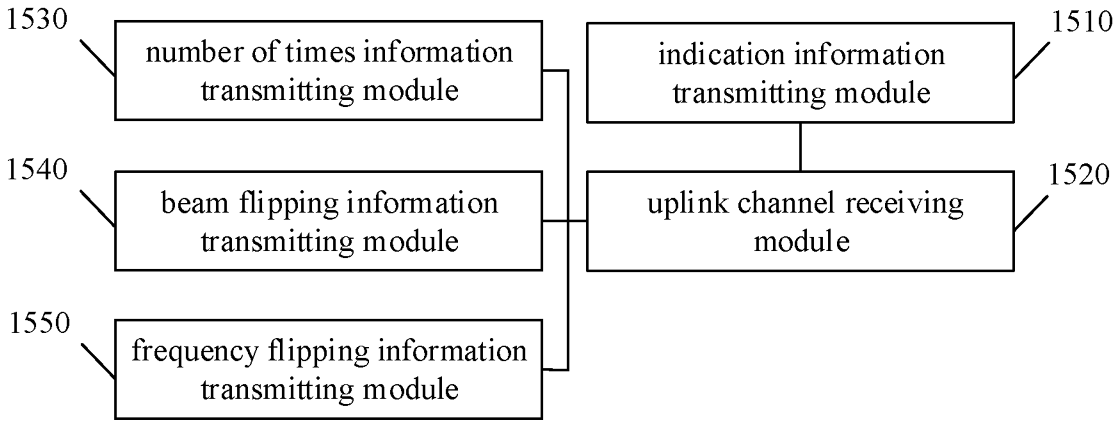
FIG. 16 is a block diagram illustrating a structure of an apparatus for an uplink channel transmission according to another embodiment of the disclosure.

In an example, as illustrated in FIG. 16, the apparatus 1500 further includes: a number of times information transmitting module 1530. The number of times information transmitting module 1530 is configured to: transmit a radio resource control (RRC) signaling to the terminal device, in which the RRC signaling is configured to configure n; or, transmit a media access control (MAC) control element (CE) or downlink control information (DCI) to the terminal device, in which the MAC CE or the DCI is configured to indicate n.

In an example, a resource size occupied by a frequency hopping resource corresponding to each of the n slots is same, and resource sizes occupied by different frequency hopping resources corresponding to a same slot of the n slots are same or different.

In an example, a frequency resource occupied by a frequency hopping resource corresponding to each of the n slots is same, and corresponding to resources occupied by different frequency hopping resources corresponding to a same slot of the n slots are same or different, and a beam mapping of the corresponding frequency hopping resource corresponding to each of the n slots is same.

In an example, each of the n slots includes a first frequency hopping resource and a second frequency hopping resource. The beam mapping of the corresponding frequency hopping resource corresponding to each of the n slots being same includes: the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

In an example, as illustrated in FIG. 16, the apparatus further includes a beam flipping information transmitting module 1540. The beam flipping information transmitting module 1540 is configured to transmit beam flipping mapping information to the terminal device. The beam flipping mapping information is configured to indicate that only a beam mapping flipping occurs within k of the n slots, where k is a positive integer less than or equal to n.

In an example, each of the n slots corresponds to a first frequency hopping resource and a second frequency hopping resource. Only the beam mapping flipping occurring within k of the n slots includes: a first frequency hopping resource corresponding to each of (n-k) slots being mapped to a transmitting beam corresponding to a first transmit-receive point (TRP); a second frequency hopping resource corresponding to each of the (n-k) slots being mapped to a transmitting beam corresponding to a second transmit-receive point (TRP); the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

In an example, as illustrated in FIG. 16, the apparatus 1500 further includes a frequency flipping information transmitting module 1550. The frequency flipping information transmitting module 1550 is configured to receive frequency flipping mapping information from the terminal device. The frequency flipping mapping information is configured to indicate that only a beam mapping flipping occurs within i of the n slots, where i is a positive integer less than or equal to n.

In an example, each of the n slots corresponds to a first frequency hopping resource and a second frequency hopping resource. Only the frequency mapping flipping occurring within i of the n slots includes: a frequency resource occupied by the first frequency hopping resource corresponding to each of (n−i) slots being a first frequency resource; a frequency resource occupied by the second frequency hopping resource corresponding to each of the (n−i) slots being a second frequency resource; the frequency resource occupied by the first frequency hopping resource corresponding to each of the i slots being the second frequency resource; and the frequency resource occupied by the second frequency hopping resource corresponding to each of the i slots being the first frequency resource.

In an example, frequency resources occupied by frequency hopping resources corresponding to adjacent slots of the n slots are different, and frequency resources occupied by different frequency hopping resources corresponding to a same slot of the n slots are same or different, and a beam mapping of the frequency hopping resource corresponding to each of the n slots is same.

In an example, each of the n slots corresponds to a first frequency hopping resource and a second frequency hopping resource. The beam mapping of the frequency hopping resource corresponding to each of the n slots being same includes: the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

In an example, as illustrated in FIG. 16, the apparatus further includes a beam flipping information transmitting module 1540. The beam flipping information transmitting module 1540 is configured to transmit beam flipping mapping information to the terminal device. The beam flipping mapping information is configured to indicate that only a beam mapping flipping occurs within k of the n slots, and k is a positive integer less than or equal to n.

In an example, each of the n slots corresponds to a first frequency hopping resource and a second frequency hopping resource. Only the beam mapping flipping occurring within k of the n slots includes: a first frequency hopping resource corresponding to each of (n-k) slots being mapped to a transmitting beam corresponding to a first transmit-receive point (TRP); a second frequency hopping resource corresponding to each of the (n-k) slots being mapped to a transmitting beam corresponding to a second transmit-receive point (TRP); the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

Figure 17:
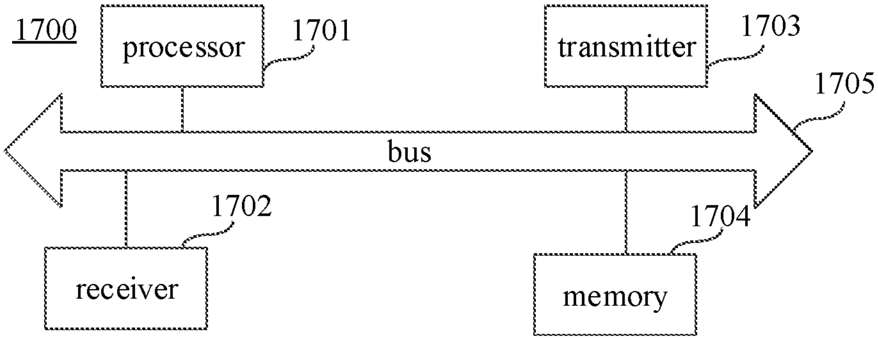
FIG. 17 is a diagram illustrating a structure of a communication system according to an embodiment of the disclosure.

FIG. 17 is a diagram of a structure of a communication device 1700 (a terminal device or a network device) provided according to an illustrative embodiment of the disclosure. The communication device 1700 includes a processor 1701, a receiver 1702, a transmitter 1703, a memory 1704 and a bus 1705.

The processor 1701 includes one or more processing cores. The processor 1701 executes various function applications and information processings by running a software program or a module.

The receiver 1702 and the transmitter 1703 may be implemented as a communication component such as a transceiver, which may be a communication chip.

The memory 1704 is communicatively connected to the processor 1701 via the bus 1705.

The memory 1704 may be configured to store at least one instruction, and the processor 1701 is configured to execute the at least one instruction to implement all steps in the above embodiment.

In addition, the memory 1704 may be implemented by any type of volatile or non-volatile storage devices or their combination. The volatile or non-volatile storage device includes but not limited to a magnetic disk or an optical disk, an electrically-erasable programmable read only memory (EEPROM), an erasable programmable read-only memory (EPROM), a static random access memory (SRAM), a read-only memory (ROM), a magnetic memory, a flash memory and a programmable read-only memory (PROM).

A system for an uplink transmission is further provided in an illustrative embodiment of the disclosure. The system includes a terminal device and a network device. The terminal device includes apparatuses for an uplink channel transmission provided in embodiments of FIG. 13 and FIG. 14; and the network device includes apparatuses for an uplink channel transmission provided in embodiments of FIG. 15 and FIG. 16.

A computer-readable storage medium is further provided in an illustrative embodiment of the present disclosure. The computer-readable storage medium stores at least one instruction, at least one program, a code set and an instruction set, the at least one instruction, the at least one program, the code set or the instruction set being loaded and executed by the processor to implement steps executed by the terminal device in the method for uplink channel transmission provided in each of the method embodiments.

A computer-readable storage medium is further provided in an illustrative embodiment of the present disclosure. The computer-readable storage medium stores at least one instruction, at least one program, a code set and an instruction set, the at least one instruction, the at least one program, the code set or the instruction set being loaded and executed by the processor to implement steps executed by the network device in the method for uplink channel transmission provided in each of the method embodiments.

It should be understood that, "a plurality of" mentioned in this disclosure refers to two or more. "and/or", describes the relationship of the association objects, indicating that there may exist three relationships, for example, A and/or B, may represent: any of existing A only, existing both A and B, or existing B only. The character "/" generally means the contextual object is a kind of "or" relationship.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

The invention claimed is:

1. A method for an uplink channel transmission, performed by a terminal device, comprising:

receiving transmission indication information from a network device, wherein:

the transmission indication information is configured to indicate a first repetition scheme for transmitting a physical uplink shared channel (PUSCH), the first repetition scheme is a combination of an inter-slot repetition scheme and an intra-slot beam hopping scheme and comprises: performing an inter-slot repetition within n slots, and performing an intra-slot beam hopping within each of the n slots, where n is an integer greater than or equal to 1, and the transmission indication information indicates transmission of the PUSCH using the first repetition scheme based on at least one of an intra-slot frequency hopping scheme or an inter-slot frequency hopping scheme being configured; and transmitting cooperatively the PUSCH to a plurality of transmit-receive points (TRPs) of the network device based on the first repetition scheme.

2. The method according to claim 1, wherein the transmission indication information indicates an intra-slot transmission scheme being the intra-slot beam hopping scheme.

3. The method according to claim 1, further comprising:

receiving a radio resource control (RRC) signaling from the network device, wherein the RRC signaling is configured to configure n;

or, receiving a media access control (MAC) control element (CE) or downlink control information (DCI) from the network device, wherein the MAC CE or the DCI is configured to indicate n.

4. The method according to claim 1, wherein a resource size occupied by a frequency hopping resource corresponding to each of the n slots is same, and resource sizes occupied by different frequency hopping resources corresponding to a same slot of the n slots are same or different.

5. The method according to claim 1, wherein a frequency resource occupied by a frequency hopping resource corresponding to each of the n slots is same, and frequency resources occupied by different frequency hopping resources corresponding to a same slot of the n slots are same or different, and a beam mapping of the frequency hopping resource corresponding to each of the n slots is same.

6. The method according to claim 5, wherein each of the n slots corresponds to a first frequency hopping resource and a second frequency hopping resource; and the beam mapping of the frequency hopping resource corresponding to each of the n slots being same comprises:

the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

7. The method according to claim 5, further comprising:

receiving beam flipping mapping information from the network device, wherein the beam flipping mapping information is configured to indicate that only a beam mapping flipping occurs within k of the n slots, wherein k is a positive integer less than or equal to n;

wherein each of the n slots corresponds to a first frequency hopping resource and a second frequency hopping resource; and only the beam mapping flipping occurring within k of the n slots comprises:

a first frequency hopping resource corresponding to each of (n−k) slots being mapped to a transmitting beam corresponding to a first transmit-receive point (TRP);

a second frequency hopping resource corresponding to each of the (n−k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

8. The method according to claim 5, further comprising:

receiving frequency flipping mapping information from the network device, wherein the frequency flipping mapping information is configured to indicate that only a beam mapping flipping occurs within i of the n slots, wherein i is a positive integer less than or equal to n;

wherein each of the n slots corresponds to a first frequency hopping resource and a second frequency hopping resource; and only the frequency mapping flipping occurring within i of the n slots comprises:

a frequency resource occupied by the first frequency hopping resource corresponding to each of (n−i) slots being a first frequency resource;

a frequency resource occupied by the second frequency hopping resource corresponding to each of the (n−i) slots being a second frequency resource;

the frequency resource occupied by the first frequency hopping resource corresponding to each of the i slots being the second frequency resource; and the frequency resource occupied by the second frequency hopping resource corresponding to each of the i slots being the first frequency resource.

9. The method according to claim 1, wherein frequency resources occupied by frequency hopping resources corresponding to adjacent slots of the n slots are different, frequency resources occupied by different frequency hopping resources corresponding to a same slot of the n slots are same or different, and a beam mapping of a frequency hopping resource corresponding to each of the n slots is same;

wherein each of the n slots corresponds to a first frequency hopping resource and a second frequency hopping resource; and the beam mapping of the frequency hopping resource corresponding to each of the n slots being same comprises:

a first frequency hopping resource corresponding to each of the n slots being mapped to a transmitting beam corresponding to a first transmit-receive point (TRP); and a second frequency hopping resource corresponding to each of the n slots being mapped to a transmitting beam corresponding to a second transmit-receive point (TRP).

10. The method according to claim 9, further comprising:

receiving beam flipping mapping information from the network device, wherein the beam flipping mapping information is configured to indicate that only a beam mapping flipping occurs within k of the n slots, wherein k is a positive integer less than or equal to n;

wherein each of the n slots corresponds to a first frequency hopping resource and a second frequency hopping resource; and only the beam mapping flipping occurring within k of the n slots comprises:

a first frequency hopping resource corresponding to each of (n−k) slots being mapped to a transmitting beam corresponding to a first transmit-receive point (TRP);

a second frequency hopping resource corresponding to each of the (n−k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

11. A method for an uplink channel transmission, performed by a network device, comprising:

transmitting transmission indication information to a terminal device, wherein:

the transmission indication information is configured to indicate a first repetition scheme for transmitting a physical uplink shared channel (PUSCH) by the terminal device, the first repetition scheme is a combination of an inter-slot repetition scheme and an intra-slot beam hopping scheme and comprises: performing an inter-slot repetition within n slots, and performing an intra-slot beam hopping within each of the n slots, where n is an integer greater than or equal to 1, and the transmission indication information indicates transmission of the PUSCH using the first repetition scheme based on at least one of an intra-slot frequency hopping scheme or an inter-slot frequency hopping scheme being configured; and receiving the PUSCH from the terminal device based on a plurality of transmit-receive points (TRPs) of the network device.

12. The method according to claim 11, wherein a resource size occupied by a frequency hopping resource corresponding to each of the n slots is same, and resource sizes occupied by different frequency hopping resources corresponding to a same slot of the n slots are same or different.

13. The method according to claim 12, further comprising:

transmitting a radio resource control (RRC) signaling to the terminal device, wherein the RRC signaling is configured to configure n;

or, transmitting a media access control (MAC) control element (CE) or downlink control information (DCI) to the terminal device, wherein the MAC CE or the DCI is configured to indicate n.

14. The method according to a claim 12, wherein a frequency resource occupied by a frequency hopping resource corresponding to each of the n slots is same, and frequency resources occupied by different frequency hopping resources corresponding to a same slot of the n slots are same or different, and a beam mapping of the frequency hopping resource corresponding to each of the n slots is same;

wherein each of the n slots corresponds to a first frequency hopping resource and a second frequency hopping resource; and the beam mapping of the frequency hopping resource corresponding to each of the n slots being same comprises:

the first frequency hopping resource corresponding to each of the n slots being mapped to a transmitting beam corresponding to a first transmit-receive point (TRP); and the second frequency hopping resource corresponding to each of the n slots being mapped to a transmitting beam corresponding to a second transmit-receive point (TRP).

15. The method according to claim 14, further comprising:

transmitting beam flipping mapping information to the terminal device, wherein the beam flipping mapping information is configured to indicate that only a beam mapping flipping occurs within k of the n slots, wherein k is a positive integer less than or equal to n;

wherein each of the n slots corresponds to a first frequency hopping resource and a second frequency hopping resource; and only the beam mapping flipping occurring within k of the n slots comprises:

a first frequency hopping resource corresponding to each of (n−k) slots being mapped to a transmitting beam corresponding to a first transmit-receive point (TRP);

a second frequency hopping resource corresponding to each of the (n−k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

16. The method according to claim 14, further comprising:

transmitting frequency flipping mapping information to the terminal device, wherein the frequency flipping mapping information is configured to indicate that only a beam mapping flipping occurs within i of the n slots, wherein i is a positive integer less than or equal to n;

wherein each of the n slots corresponds to a first frequency hopping resource and a second frequency hopping resource; and only the frequency mapping flipping occurring within i of the n slots comprises:

a frequency resource occupied by the first frequency hopping resource corresponding to each of (n−i) slots being a first frequency resource;

a frequency resource occupied by the second frequency hopping resource corresponding to each of the (n−i) slots being a second frequency resource;

the frequency resource occupied by the first frequency hopping resource corresponding to each of the i slots being the second frequency resource; and the frequency resource occupied by the second frequency hopping resource corresponding to each of the i slots being the first frequency resource.

17. The method according to claim 12, wherein frequency resources occupied by frequency hopping resources corresponding to adjacent slots of the n slots are different, frequency resources occupied by different frequency hopping resources corresponding to a same slot of the n slots are same or different, and a beam mapping of a frequency hopping resource corresponding to each of the n slots is same;

wherein each of the n slots corresponds to a first frequency hopping resource and a second frequency hopping resource; and the beam mapping of the frequency hopping resource corresponding to each of the n slots being same comprises:

a first frequency hopping resource corresponding to each of the n slots being mapped to a transmitting beam corresponding to a first transmit-receive point (TRP); and a second frequency hopping resource corresponding to each of the n slots being mapped to a transmitting beam corresponding to a second transmit-receive point (TRP).

18. The method according to claim 17, further comprising:

transmitting beam flipping mapping information to the terminal device, wherein the beam flipping mapping information is configured to indicate that only a beam mapping flipping occurs within k of the n slots, wherein k is a positive integer less than or equal to n;

wherein each of the n slots corresponds to a first frequency hopping resource and a second frequency hopping resource; and only the beam mapping flipping occurring within k of the n slots comprises:

a first frequency hopping resource corresponding to each of (n−k) slots being mapped to a transmitting beam corresponding to a first transmit-receive point (TRP);

a second frequency hopping resource corresponding to each of the (n−k) slots being mapped to a transmitting beam corresponding to a second transmit-receive point (TRP);

the first frequency hopping resource corresponding to each of the k slots being mapped to the transmitting beam corresponding to the second TRP; and the second frequency hopping resource corresponding to each of the k slots being mapped to the transmitting beam corresponding to the first TRP.

19. A terminal device, comprising:

a processor; and a transceiver connected to the processor;

wherein the processor is configured to load and execute executable instructions to implement:

receiving transmission indication information from a network device, wherein:

the transmission indication information is configured to indicate a first repetition scheme for transmitting a physical uplink shared channel (PUSCH), the first repetition scheme is a combination of an inter-slot repetition scheme and an intra-slot beam hopping scheme and comprises: performing an inter-slot repetition within n slots, and performing an intra-slot beam hopping within each of the n slots, where n is an integer greater than or equal to 1, and the transmission indication information indicates transmission of the PUSCH using the first repetition scheme based on at least one of an intra-slot frequency hopping scheme or an inter-slot frequency hopping scheme being configured; and transmitting cooperatively the PUSCH to a plurality of transmit-receive points (TRPs) of the network device based on the first repetition scheme.

20. A network device, configured to perform the method of claim 11.

* * * * *